United States Patent [19]
Kim et al.

[11] Patent Number: 5,862,254
[45] Date of Patent: Jan. 19, 1999

[54] IMAGE ENHANCING METHOD USING MEAN-MATCHING HISTOGRAM EQUALIZATION AND A CIRCUIT THEREFOR

[75] Inventors: Young-taek Kim, Suwon; Yong-hun Cho, Seoul, both of Rep. of Korea

[73] Assignee: Samsung Electronics Co., Ltd., Kyungki-Do, Rep. of Korea

[21] Appl. No.: 819,029

[22] Filed: Mar. 17, 1997

[30] Foreign Application Priority Data

Apr. 10, 1996 [KR] Rep. of Korea ................ 1996 10783
May 21, 1996 [KR] Rep. of Korea ................ 1996 17211

[51] Int. Cl.$^6$ ...................................................... G06K 9/00
[52] U.S. Cl. ...................................... 382/168; 382/274
[58] Field of Search ...................... 378/98.7, 97; 342/64, 342/52, 53, 62, 63, 67; 244/3.15, 3.16, 3.17, 3.19; 382/168, 169, 170, 171, 172, 173, 181, 190, 224, 254, 260, 266, 270, 271, 272, 273, 274, 275, 286, 293, 299, 300, 305, 307

[56] References Cited

U.S. PATENT DOCUMENTS 5,341,142  8/1994  Reis et al. ................................. 342/64
5,675,624  10/1997  Relihan et al. ........................ 378/98.7

*Primary Examiner*—Leo H. Boudreau
*Assistant Examiner*—Bijan Tadayon
*Attorney, Agent, or Firm*—Sughrue, Mion, Zinn, Macpeak & Seas, PLLC

[57] ABSTRACT

A histogram-equalization method and circuit for enhancing an image signal represented by a predetermined number of gray levels is presented. The method calculates a cumulative density function and a mean level in a unit of a picture, and maps an input sample into a new gray level according to a transform function which is defined by use of the cumulative density function and the mean level. The method may also include a step of obtaining a compensated mean level by adding to the mean brightness level, so that the input sample is mapped into the compensated mean level according to the mean level. Thus, a brightness compensation may be carried out along with the contrast enhancement of the image.

18 Claims, 5 Drawing Sheets

IMAGE ENHANCING METHOD USING MEAN-MATCHING HISTOGRAM EQUALIZATION AND A CIRCUIT THEREFOR

FIELD OF THE INVENTION

The present invention relates to a method for enhancing an image using mean-matching histogram equalization and a circuit therefor. More particularly, the present invention relates to a method for enhancing the contrast of an image while preserving the mean brightness of the image, and a circuit suitable for the method.

BACKGROUND OF THE INVENTION

A histogram of gray levels provides an overall description of the appearance of an image. Properly adjusted gray levels for a given image can enhance the appearance or contrast thereof.

Among the many methods for contrast enhancement, the most widely known one is histogram equalization, in which the contrast of a given image is enhanced according to the sample distribution thereof. The method is disclosed in the following documents: [1] J. S. Lim, "Two-dimensional Signal and Image Processing," Prentice Hall, Englewood Cliffs, N.J., 1990, and [2] R. C. Gonzalez and P. Wints, "Digital Image Processing," Addison-Wesley, Reading, Mass., 1977.

Also, useful applications of the histogram equalization method, including medical image processing and radar image processing, are disclosed in the following documents: [3] J. Zimmerman, S. Pizer, E. Staab, E. Perry, W. McCartney and B. Brenton, "Evaluation of the Effectiveness of Adaptive Histogram Equalization for Contrast Enhancement," IEEE Tr. on Medical Imaging, pp. 304–312, December 1988, and [4] Y. Li, W. Wang and D. Y. Yu, "Application of Adaptive Histogram Equalization to X-ray Chest Image," Proc. of the SPIE, pp. 513–514, vol. 2321, 1994.

In general, since histogram equalization causes the dynamic range of an image to be expanded, the density distribution of the resultant image is made flat and the contrast of the image is enhanced as a consequence thereof.

This widely-known characteristic of histogram equalization is disadvantageous in some cases. That is, as the output density of the histogram equalization becomes uniform, the mean brightness of an output image approaches the middle gray level value. Actually, for the histogram equalization of an analog image, the mean brightness of the output image is exactly the middle gray level regardless of the mean brightness of the input image. It is obvious that this feature is not desirable in some real applications. For instance, an image taken at nighttime can appear to be an image taken in the daytime after histogram equalization has been performed. Meanwhile, too dark or too bright image signals result in a low contrast after the equalization.

SUMMARY OF THE INVENTION

To solve the above problems, it is an object of the present invention to provide an image enhancing method wherein contrast is enhanced while the mean brightness of a given image is preserved by employing a cumulative density function of the given image in a transform function and controlling the transform function so that the mean gray level of the given image is mapped into itself during histogram equalization.

It is an another object of the present invention to provide an image enhancing method which concurrently enables brightness compensation and contrast enhancement by adding a brightness compensation value to a mean brightness level of an input image according to the mean brightness level and controlling the transform function so that the mean gray level of the input image is mapped into the compensated mean level.

It is yet another object of the present invention to provide an image enhancing circuit wherein contrast is enhanced while the mean brightness of a given image is preserved by employing a cumulative density function of the given image in a transform function and controlling the transform function so that the mean gray level of the given image is mapped into itself during histogram equalization.

It is still yet another object of the present invention to provide an image enhancing circuit which concurrently enables brightness compensation and contrast enhancement by adding a brightness compensation value to a mean brightness level of an input image according to the mean brightness level and controlling the transform function so that the mean gray level of the input image is mapped into the compensated mean level.

Accordingly, to achieve one of the objects above, there is provided a method for enhancing an image by histogram-equalizing an image signal represented by a predetermined number of gray levels, the method comprising the steps of: (a) obtaining a cumulative density function of the image signal in a unit of a picture; (b) calculating a mean level of the image signal in a unit of a picture; and (c) equalizing the image signal by mapping each sample of the image signal to a gray level by use of a transform function which employs the cumulative density function, wherein, the transform function maps the mean level into the same level.

To achieve another one of the objects above, there is provided a method for enhancing an image by histogram-equalizing an image signal represented by a predetermined number of gray levels, the method comprising the steps of: (a) obtaining a cumulative density function of the image signal in a unit of a picture; (b) calculating a mean level of the image signal in a unit of a picture; (c) obtaining a compensated mean level by adding a bright compensation value to the mean level according to the mean level of the input image; and (d) equalizing the image signal by mapping each sample of the image signal to a gray level by use of a transform function which employs the cumulative density function, wherein the transform function maps the mean level into the compensated mean level.

To achieve yet another one of the objects above, there is provided an image enhancing circuit for histogram-equalizing an image signal represented by a predetermined number of gray levels, the circuit comprising: first calculating means for calculating a mean level of an input image signal in a unit of a picture; second calculating means for calculating a gray level distribution of the image signal in a unit of a picture, calculating a cumulative density function in a unit of a picture based on the gray level distribution, and outputting a cumulative density function value corresponding to each input sample of the image signal and a cumulative density function value of the mean level; and outputting means for mapping the input sample to a gray level according cumulative density function values corresponding to the input sample and the mean level and outputting a mapped level as an equalized signal, wherein the mean level is mapped into the same level.

To achieve still yet another one of the objects above, there is provided an image enhancing circuit for histogram-equalizing an image signal represented by a predetermined number of gray levels, the circuit comprising: first calculating means for calculating a mean level of an input image signal in a unit of a picture; second calculating means for calculating a gray level distribution of the image signal in a unit of a picture, calculating a cumulative density function in a unit of a picture based on the gray level distribution, and outputting a cumulative density function value corresponding to each input sample of the image signal and a cumulative density function value of the mean level; brightness compensating means for adding to the mean level a brightness compensation value calculated by a predetermined compensation function according to the mean level of the input image signal to output a compensated mean level; and outputting means for mapping the input sample to a gray level according to cumulative density function values corresponding to the input sample and the mean level and outputting a mapped level as an equalized signal, wherein the mean level is mapped into the compensated mean level.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
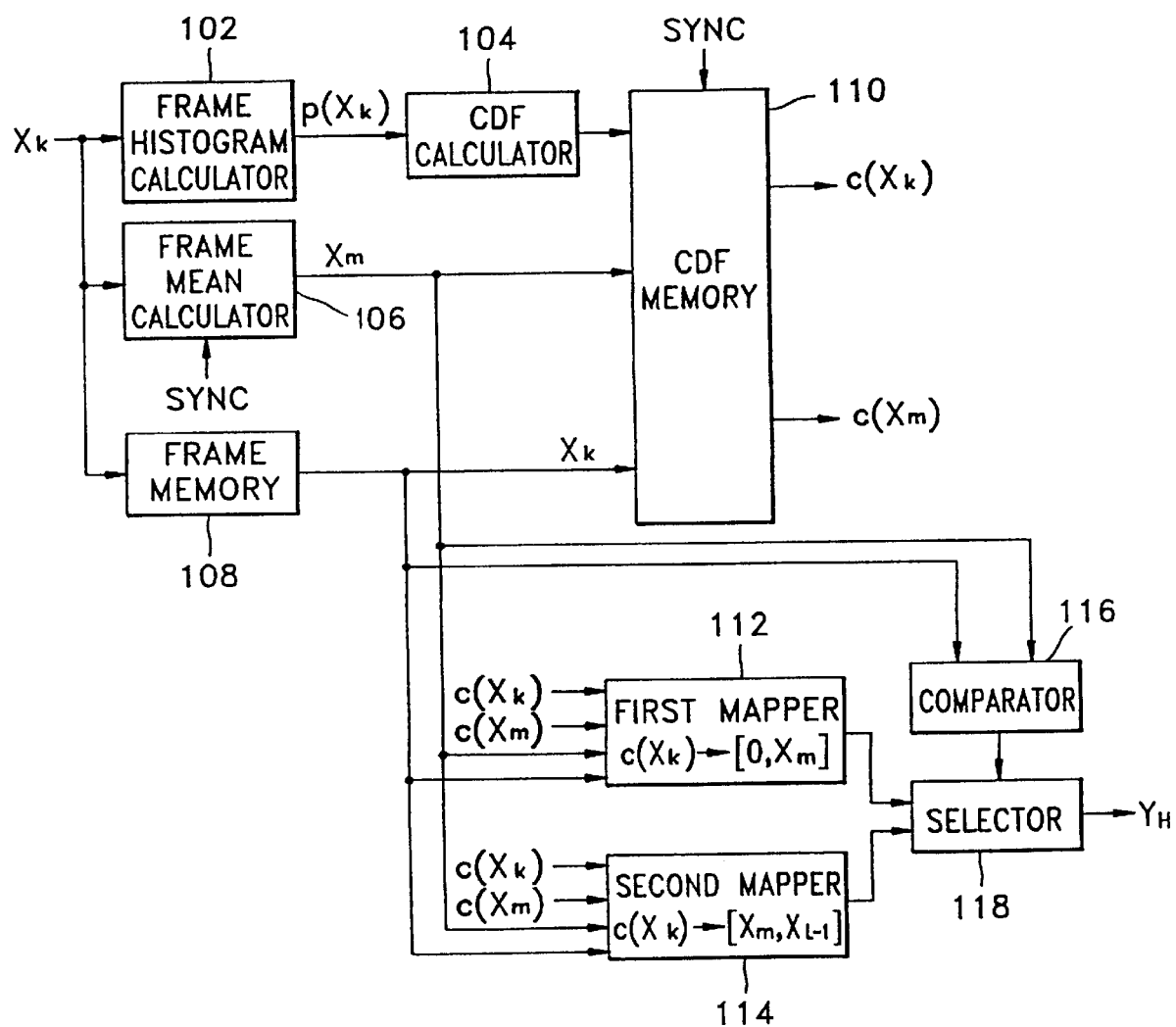
FIG. 1 is a block diagram of an image enhancing circuit using mean-matching histogram equalization according to a first embodiment of the present invention.

The image enhancement method using mean-matching histogram equalization according to the present invention will now be described.

Here, $\{X\}$ denotes a given image, and $X_m$ denotes the mean brightness level (hereinafter, referred to as "mean level") of $\{X\}$. The given image $\{X\}$ is composed of L discrete gray levels denoted by $\{X_0, X_1, \ldots, X_{L-1}\}$, where $X_0=0$ represents a black level and $X_{L-1}=L$ represents a white level. Also, it is assumed that $X_m \in \{X_0, X_1, \ldots, X_{L-1}\}$.

A probability density function (PDF) for $\{X\}$ is defined as follows.

$$p(X_k) = \frac{n_k}{n}, \text{ for } k = 0, 1, \ldots, L-1 \quad (1)$$

where, $n_k$ represents the number of occurrences of the gray level $X_k$ in the image $\{X\}$ and n represents the total number of samples in $\{X\}$.

Also, a cumulative density function (CDF) is defined as $$c(X_k) = \sum_{j=0}^{k} p(X_j) \quad (2)$$

Based on the CDF, the output of a typical histogram equalization, $Y_t$, for the given input sample $X_k$ is given by $$Y_t = X_0 + (X_{L-1} - X_0) c(X_k) \quad (3)$$

where, it is assumed that $X_0=0$ (Black) and $X_{L-1}=1$ (white).

The biggest problem occurring during the histogram equalization is that the mean brightness level of an output signal can be drastically changed from that of an input signal depending on the CDF used as a transform function.

To overcome such a drawback, in a first method of the present invention, the following mapping operation which is based on the mean of the input image combined with the CDF is proposed.

$$Y_H = \begin{cases} \dfrac{c(X_k)}{c(X_m)} X_m, & \text{if } X_k \leq X_m \\ X_m + (X_{L-1} - X_m) \dfrac{c(X_k) - c(X_m)}{1 - c(X_m)}, & \text{if } X_k > X_m \end{cases} \quad (4)$$

That is, the samples which are equal to or less than the mean level $X_m$ are mapped into gray levels of from $X_0$ to $X_m$ ($X_0$, $X_m$) by the relation $$\frac{c(X_k)}{c(X_m)} X_m,$$

and the samples greater than the mean level are mapped into gray levels of from $X_m$ to $X_{L-1}$ ($X_m$, $X_{L-1}$) by the relation $$X_m + (X_{L-1} - X_m) \frac{c(X_k) - c(X_m)}{1 - c(X_m)}.$$

It is noted that $X_m$ is mapped into $X_m$ in the expression (4).

Thus, when a given image is histogram-equalized according to a cumulative density function, the mean brightness of the given image is prevented from being changed due to histogram equalization by modifying a transform function according to the equation (4) so that the mean level of the given image is mapped into itself. Such a method is referred to, in the present invention, as a mean-matching histogram equalization.

In a second method according to the present invention, the following mapping operation is proposed, which can also compensate the level of brightness when the mean brightness of a given input image signal is excessively dark or bright.

$$Y_H = \begin{cases} \dfrac{c(X_k)}{c(X_m)} B_m, & \text{if } X_k \leq X_m \\ B_m + \dfrac{c(X_k) - c(X_m)}{1 - c(X_m)} (X_{L-1} - B_m), & \text{if } X_k > X_m \end{cases} \quad (5)$$

where, $$B_m = X_m + \Delta \quad (6)$$

Here, $B_m$ is a compensated mean level and $\Delta$ is a brightness compensation value which is preset by use of a predetermined compensation function according to the brightness level. Thus, the compensated mean level $B_m$ results from adding the brightness compensation value $\Delta$ to the mean level $X_m$. At this time, we also assume that $B_m \in \{X_0, X_1, \ldots, X_{L-1}\}$.

Thus, the equalized output $Y_H$ becomes brighter when the brightness compensation value is greater than 0 ($\Delta$>0), and the equalized output $Y_H$ becomes darker when the brightness compensation value is less than 0 ($\Delta$<0). As $\Delta$ is increased, the dynamic range of a lower gray level portion of the image is enhanced, and as $\Delta$ is decreased, the dynamic range of an upper gray level portion is enhanced. The compensated mean level $B_m$ appropriately compensated according the mean level $X_m$ of the given image signal, that is, the brightness and darkness of the image, enhances greatly the quality of the input image along with the mean-matching histogram equalization.

As a consequence, according to the equation (5), the input samples which are equal to or less than the mean level $X_m$ are mapped into gray levels of from $X_0$ to $B_m$ ($X_0$, $B_m$) by the relation $$\frac{c(X_k)}{c(X_m)} B_m,$$

and the samples greater than the mean level $X_m$ are mapped into gray levels of from $B_m$ to $X_{L-1}$ ($B_m$, $X_{L-1}$) by the relation $$B_m + \frac{c(X_k) - c(X_m)}{1 - c(X_m)} (X_{L-1} - B_m).$$

It is noted that $X_m$ is mapped into $B_m$ in expression (5).

Thus, when a given image is histogram-equalized according to a cumulative density function, the mean brightness of the given image is compensated, while contrast is also enhanced, by modifying a transform function according to the equation (5) so that the mean level of the given image is mapped into the compensated mean level.

Referring to FIGS. 1–6, the embodiment of an image enhancement circuit using the mean-matching histogram equalization will now be described.

FIG. 1 is a block diagram of an image enhancement circuit using the mean-matching histogram equalization according to a first embodiment of the present invention.

In FIG. 1, a frame histogram calculator 102 calculates the probability density function $p(X_k)$ which represents a gray level distribution in the input image $\{X\}$ according to the equation (1) by a unit of a picture. At this stage, a frame is used for the picture unit. However, a field may alternatively be used for the picture unit.

A cumulative density function (CDF) calculator 104 calculates the cumulative density function $c(X_k)$ according to the equation (2) based on the probability density function $p(X_k)$ of one frame calculated by the frame histogram calculator 102.

A frame mean calculator 106 calculates the mean level $X_m$ of the one frame input image $\{X\}$ in a unit of one frame and outputs the mean level $X_m$ in a unit of a frame to a CDF memory 110, first and second mappers 112 and 114, and a comparator 116 according to a synchronization signal (here, a frame sync signal SYNC).

A frame memory 108 stores the input image $\{X\}$ by a frame unit. Since the cumulative density function $c(X_k)$ calculated by the CDF calculator 104 is the cumulative density function of an image delayed by one frame compared with the currently input image $\{X\}$, the input image $\{X\}$ is delayed by one frame by the frame memory 108 so that an image signal of the frame corresponding to the cumulative density function $c(X_k)$ is input to the first and second mappers 112 and 114.

The CDF memory 110 stores the cumulative density function $c(X_k)$ calculated by the CDF calculator 104 by a unit of one frame, updates the stored values according to the synchronization signal SYNC, and outputs the cumulative density function value $c(X_k)$ corresponding to a sample $X_k$ output by the frame memory 108 and the cumulative density function value $c(X_m)$ corresponding to the mean level $X_m$ output by the frame mean calculator 106. At this stage, the CDF memory 110 is used as a buffer.

The first mapper 112 receives the cumulative density function values $c(X_k)$ and $c(X_m)$ from the CDF memory 110, the mean level $X_m$ from the frame mean calculator 106 and the one-frame delayed input sample $X_k$ from the frame memory 108, and maps the one-frame delayed input sample $X_k$ to a gray level of from $X_0$ to $X_m$ according to the first expression in the equation (4) to output an enhanced signal $Y_H$.

The second-mapper 114 receives the cumulative density function values $c(X_k)$ and $c(X_m)$ from the CDF memory 110, the mean level $X_m$ from the frame mean calculator 106 and the one-frame delayed input sample $X_k$ from the frame memory 108, and maps the one-frame delayed input sample $X_k$ to a gray level of from $X_m$ to $X_{L-1}$ according to the second expression in the equation (4) to output an enhanced signal $Y_H$.

The comparator 116 compares the input sample $X_k$ output by the frame memory 108 with the mean level $X_m$ output by the frame mean calculator 106, and outputs a selection control signal according to the compared result.

A selector 118 selects the signal output by the first mapper 112 or that by the second mapper 114 in accordance with the selection control signal. Specifically, the selector 118 selects the signal output by the first mapper 112 in case that the selection control signal indicates that the input sample $X_k$ is less than or equal to the mean level $X_m$. Meanwhile, the selector 118 selects the signal output by the second mapper 114 in the case that the selection control signal indicates that the input sample $X_k$ is greater than the mean level $X_m$. Then, the selector 118 outputs the selected signal as the output image $Y_H$ in expression (4).

In the present invention, the histogram calculator 102 and the CDF calculator 104 can be incorporated into a single block for calculating the gray level distribution and calculating the CDF also according to the gray level distribution in a unit of a picture with respect to the input image $\{X\}$.

Figure 2:
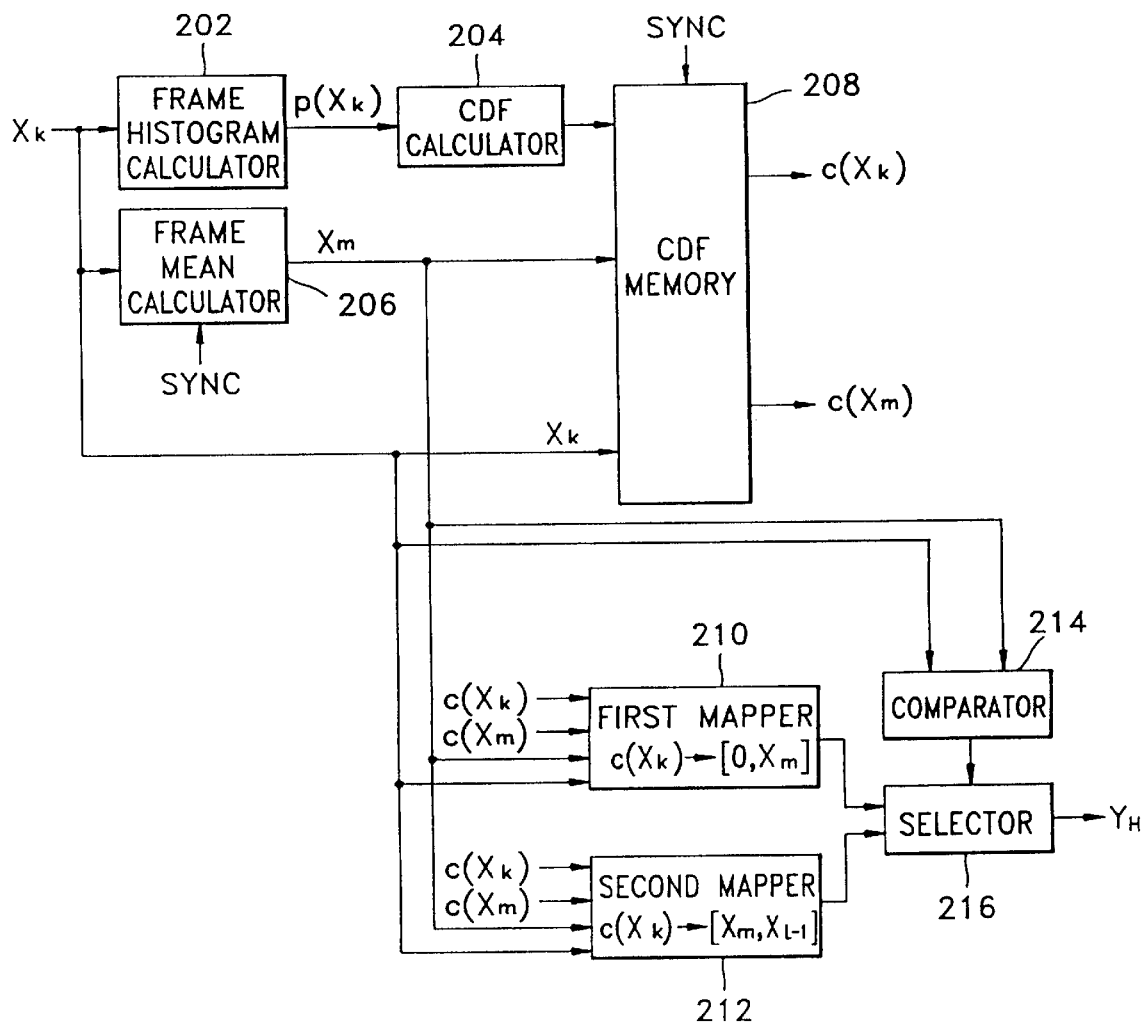
FIG. 2 is a block diagram of an image enhancing circuit using mean-matching histogram equalization according to a second embodiment of the present invention.

FIG. 2 is a block diagram of an image enhancement circuit using the mean-matching histogram equalization according to a second embodiment of the present invention.

In FIG. 2, a frame histogram calculator 202 calculates the probability density function $p(X_k)$ which represents a gray level distribution in the input image $\{X\}$ according to the equation (1) by a unit of a picture.

A CDF calculator 204 calculates the cumulative density function $c(X_k)$ according to the equation (2) based on the probability density function $p(X_k)$ of one frame calculated by the frame histogram calculator 202.

A frame mean calculator 206 calculates the mean level $X_m$ of the input image $\{X\}$ in a unit of one frame and outputs the mean level $X_m$ to a CDF memory 208, first and second mappers 210 and 212, and a comparator 214 according to a frame sync signal SYNC.

The CDF memory 208 stores the cumulative density function value $c(X_k)$, for k=0, 1, . . . , L-1 calculated by CDF calculator 204 by a unit of one frame, updates the stored values according to the frame sync signal SYNC, and outputs the cumulative density function value $c(X_k)$ corresponding to an input sample $X_k$ and the cumulative density function value $c(X_m)$ corresponding to the mean level $X_m$ output by the frame mean calculator 206.

The first mapper 210 receives the cumulative density function values $c(X_k)$ and $c(X_m)$ from the CDF memory 208, the mean level $X_m$ from the frame mean calculator 206, and the input sample $X_k$, and then maps the input sample $X_k$ to a gray level of from $X_0$ to $X_m$ according to the first expression in the equation (4) to thereby output an enhanced signal $Y_H$.

The second mapper 212 receives the cumulative density function values $c(X_k)$ and $c(X_m)$ from the CDF memory 208, the mean level $X_m$ from the frame mean calculator 206, and the input sample $X_k$, and then maps the input sample $X_k$ to a gray level of from $X_m$ to $X_{L-1}$ according to the second expression in the equation (4) to output an enhanced signal $Y_H$.

The comparator 214 compares the input sample $X_k$ with the mean level $X_m$ output by the frame mean calculator 206, and outputs a selection control signal.

A selector 216 selects the signal output by the first mapper 210 or the output of the second mapper 212 in accordance with the selection control signal. Specifically, the selector 216 selects the signal output by the first mapper 210 in case that the selection control signal indicates that the input sample $X_k$ is less than or equal to the mean level $X_m$. Meanwhile, the selector 216 selects the signal output by the second mapper 212 in the case that the selection control signal indicates that the input sample $X_k$ is greater than the mean level $X_m$.

In this embodiment of FIG. 2, a frame memory has been omitted, compared with the first embodiment of the present invention of FIG. 1, considering the feature that there exists a high correlation between the neighboring frames. Thus, the sample $X_k$ input to the first and the second mappers 210 and 212 belong to a frame next to the one to which the output signals of the CDF memory 208 is related. Consequently, the hardware is reduced.

Figure 3:
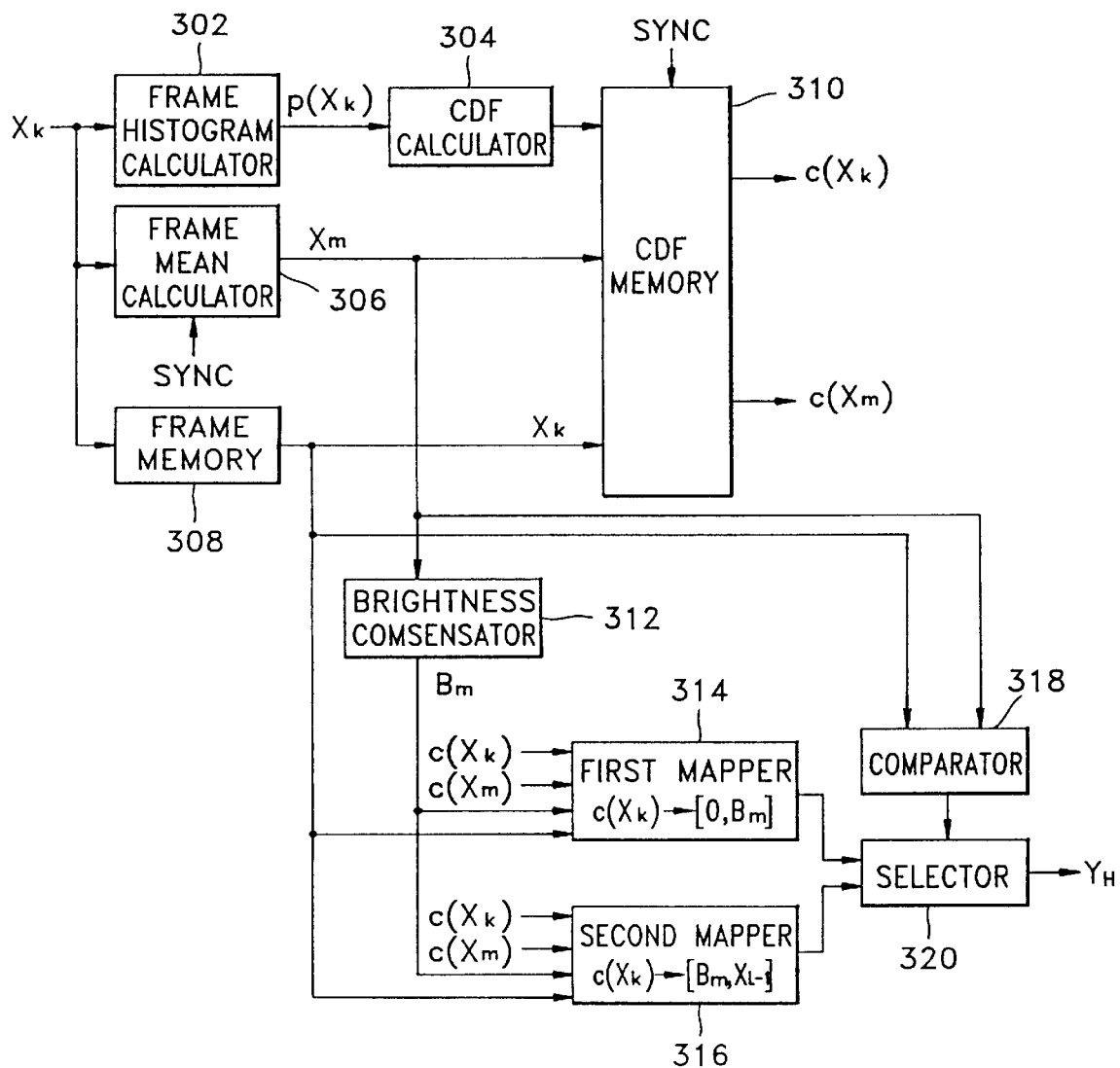
FIG. 3 is a block diagram of an image enhancing circuit using mean-matching histogram equalization according to a third embodiment of the present invention.

FIG. 3 illustrates a third embodiment of an image enhancing circuit using mean-matching histogram equalization according to the present invention. The components of the circuit shown in FIG. 3 are similar to the components of the circuit shown in FIG. 1 except for a brightness compensator 312, and first and second mappers 314 and 316. Thus, the description will be focused on the brightness compensator 312, and the first and second mappers 314 and 316.

In FIG. 3, the brightness compensator 312 receives the mean level $X_m$ output by a frame mean calculator 306, adds a brightness compensation value ($\Delta$) corresponding to the mean brightness of an input image, as described in the equation (6), and outputs the compensated mean level $B_m$.

Figure 4A:
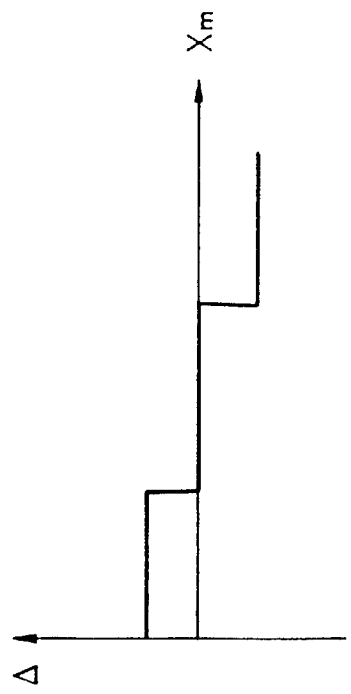
FIGS. 4A and 4B are graphs showing examples of a brightness compensation function applied to the present invention.
Figure 4B:
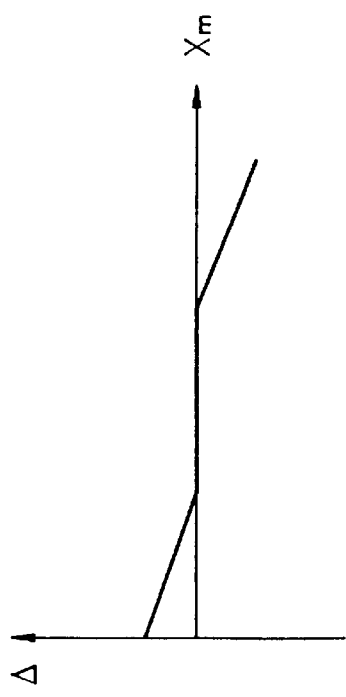

The brightness compensation value $\Delta$ is determined by use of a predetermined compensation function such as those shown in FIGS. 4A and 4B. However, the compensation functions shown in FIGS. 4A and 4B are not more than exemplary ones, and other functions of different shapes can be contemplated as well.

The brightness of the equalized output is controlled by the brightness compensation value according to the compensation function as shown in FIGS. 4A and 4B. Specifically, when the mean level $X_m$ of the input image is very low, i.e., for a quite dark image, the equalized output becomes brighter by the mean-matching histogram equalization method of the present invention since a brightness compensation value $\Delta$ greater than "0" is added to the mean level $X_m$.

Meanwhile, when the mean level $X_m$ of the input image is very high, i.e., for a quite bright image, the equalized output becomes darker by the mean-matching histogram equalization method of the present invention since a brightness compensation value $\Delta$ less than "0" is added to the mean level $X_m$. Accordingly, the compensated mean level $B_m$ compensated by a suitable brightness compensation value $\Delta$ according to the mean level $X_m$ drastically improves the quality of the input image.

Figure 5A:
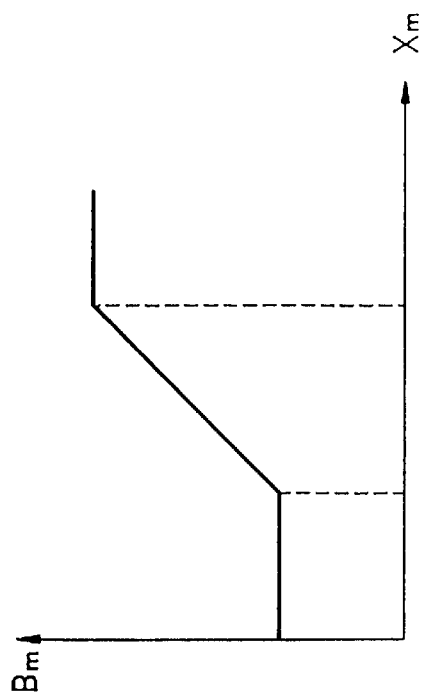
FIGS. 5A and 5B are graphs showing examples of the relation between the mean level of an input image and the mean level compensated by the brightness compensation functions shown in FIGS. 4A and 4B, respectively.
Figure 5B:
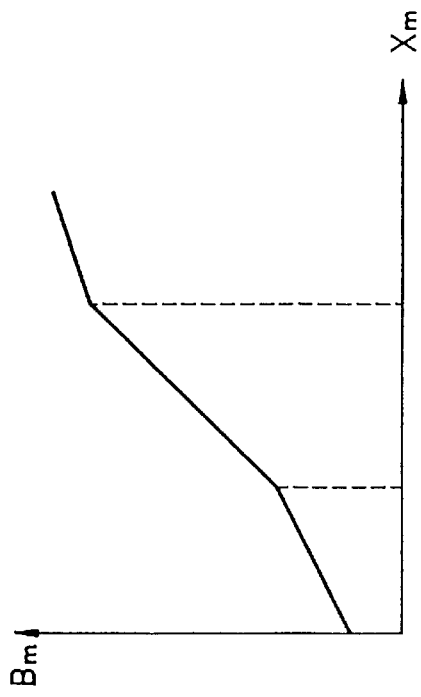

FIGS. 5A and 5B show the relation between the compensated mean level $B_m$ compensated by a compensated brightness compensation value $\Delta$ in accordance with the brightness compensation function shown in FIGS. 4A and 4B and the mean level $X_m$ of the input image.

The first mapper 314 receives the cumulative density function values $c(X_k)$ and $c(X_m)$ from a CDF memory 310, the compensated mean level $B_m$ from the brightness compensator 312 and the input sample ($X_k$) from a frame memory 308, and maps the input sample ($X_k$) to a gray level of from $X_0$ to $B_m$ according to the first expression in the equation (5) to output an enhanced signal $Y_H$.

The second mapper 316 receives the cumulative density function values $c(X_k)$ and $c(X_m)$ from the CDF memory 310, the compensated mean level $B_m$ from the brightness compensator 312 and the input sample $X_k$ from the frame memory 308, and maps the input sample $X_k$ to a gray level of from $B_m$ to $X_{L-1}$ according to the second expression in the equation (5) to output an enhanced signal $Y_H$.

Figure 6:
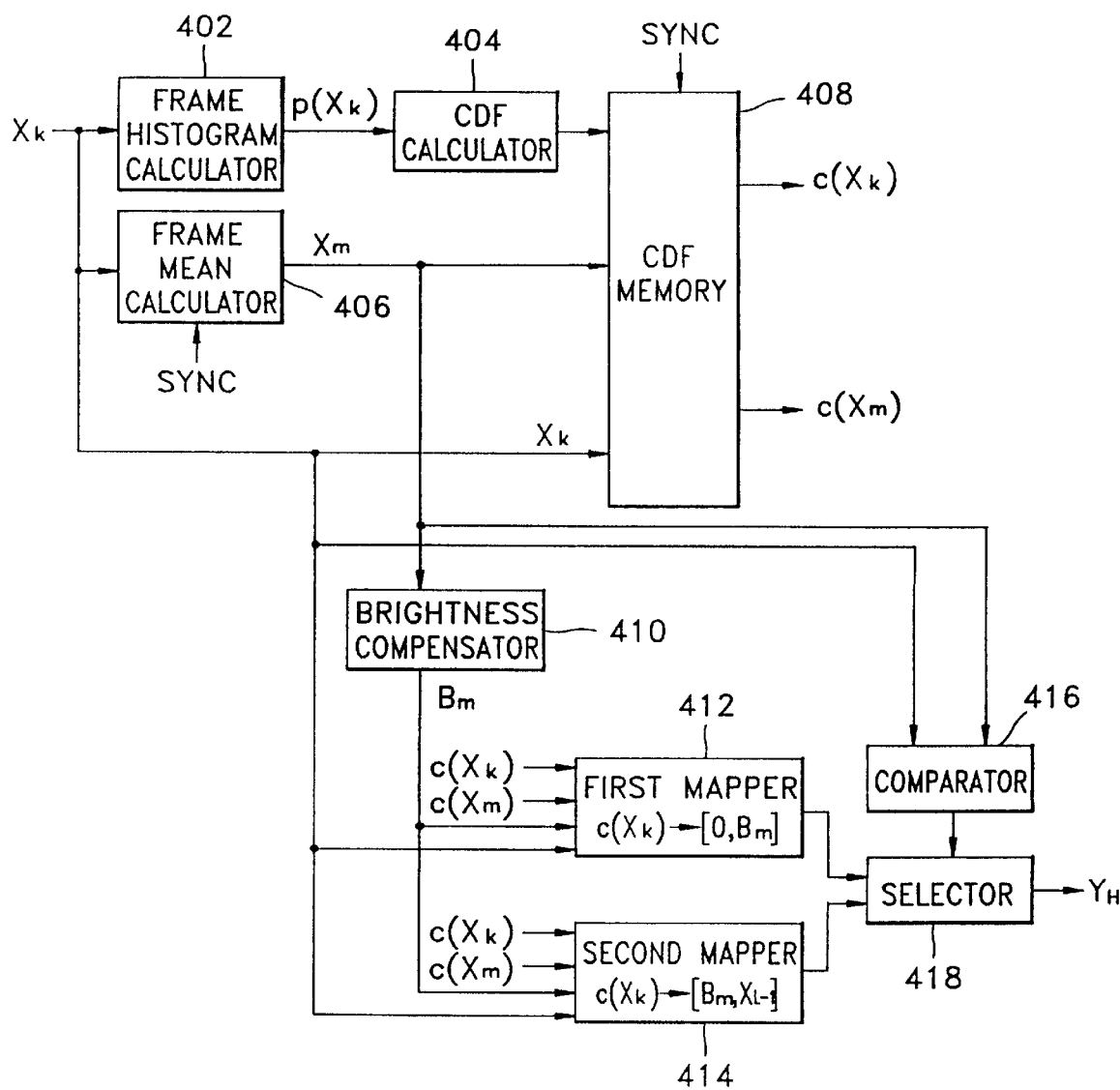
FIG. 6 is a block diagram of an image enhancing circuit using mean-matching histogram equalization according to a fourth embodiment of the present invention.

FIG. 6 illustrates a fourth embodiment of an image enhancing circuit using mean-matching histogram equalization according to the present invention. The components of the circuit shown in FIG. 6 are similar to the components of the circuit shown in FIG. 2 except for a brightness compensator 410, and first and second mappers 412 and 414. Thus, the description will be focused on the brightness compensator 410, and the first and second mappers 412 and 414.

In FIG. 6, the brightness compensator 410 receives the mean level $X_m$ output by a frame mean calculator 406, adds a brightness compensation value ($\Delta$) corresponding to the mean brightness of an input image, as described in the equation (6), and outputs the compensated mean level $B_m$.

The first mapper 412 receives the cumulative density function values $c(X_k)$ and $c(X_m)$ from a CDF memory 408, the compensated mean level $B_m$ from the brightness compensator 410 and the input sample $X_k$, and maps the input sample $X_k$ to a gray level of from $X_0$ to $B_m$ according to the first expression in the equation (5) to output an enhanced signal $Y_H$.

The second mapper 414 receives the cumulative density function values $c(X_k)$ and $c(X_m)$ from the CDF memory 408, the compensated mean level $B_m$ from the brightness compensator 410 and the input sample $X_k$, and maps the input sample $X_k$ to a gray level of from $B_m$ to $X_{L-1}$ according to the second expression in the equation (5) to output an enhanced signal $Y_H$.

As was the case for the image enhancing circuit of FIG. 2, the hardware is reduced by omitting the frame memory considering the characteristics that there exists a high correlation between the neighboring frames.

As described above, in the present invention, a transform function is controlled to allow the mean gray level of the given image to be mapped into itself when the histogram equalization is performed using the cumulative density function of the given image signal as the transform function, so that the mean brightness of a given image is preserved while contrast is enhanced.

Also, the present invention can achieve the brightness compensation and contrast enhancement concurrently by controlling the transform function to allow the mean gray level of the given image to be mapped into the compensated mean level which is compensated according to the brightness thereof when the histogram equalization is performed in accordance with the cumulative density function of the given image signal. Furthermore, the image quality can be drastically improved by enhancing the contrast of too dark or too bright input image signals.

What is claimed is:

1. A method for image enhancing by histogram-equalizing an image signal represented by a predetermined number of gray levels, said method comprising the steps of:
   (a) obtaining a cumulative density function of the image signal in units of a picture;
   (b) calculating a mean level of the image signal in units of a picture; and
   (c) equalizing the image signal by mapping each sample of the image signal to a gray level by use of a transform function which employs the cumulative density function, wherein, the transform function maps the mean level unchanged.

2. A method for enhancing image as claimed in claim 1, further comprising a step of:
   (d) delaying the image signal in units of a picture;
   wherein, a delayed image signal is equalized in said step (c).

3. A method for image enhancing by histogram-equalizing an image signal represented by a predetermined number of gray levels, said method comprising the steps of:
   (a) obtaining a gray level distribution of the image signal in units of a picture and then obtaining a cumulative density function in units of a picture based on the gray level distribution;
   (b) calculating a mean level of the image signal in units of a picture;
   (c) obtaining a cumulative density function value corresponding to the mean level based on the cumulative density function; and
   (d) equalizing the image signal by mapping each input sample of the image signal to a gray level according to cumulative density function values corresponding to the input sample and the mean level, wherein the mean level is mapped unchanged.

4. A method for image enhancing as claimed in claim 3, further comprising a step of:
   (e) delaying the image signal in units of a picture;
   wherein, a delayed image signal is equalized in said step (c).

5. A method for image enhancing by histogram-equalizing an image signal represented by a predetermined number of gray levels, said method comprising the steps of:
   (a) obtaining a cumulative density function of the image signal in units of a picture;
   (b) calculating a mean level of the image signal in units of a picture;
   (c) obtaining a compensated mean level by adding a brightness compensation value to the mean level according to the mean level of the input image; and
   (d) equalizing the image signal by mapping each sample of the image signal to a gray level by use of a transform function which employs the cumulative density function, wherein, the transform function maps the mean level into the compensated mean level.

6. A method for image enhancing as claimed in claim 5, further comprising a step of:
   (e) delaying the image signal in units of a picture;
   wherein, a delayed image signal is equalized in said step (d).

7. A method for image enhancing by histogram-equalizing an image signal represented by a predetermined number of gray levels, said method comprising the steps of:
   (a) obtaining a gray level distribution of the image signal in units of a picture and then obtaining a cumulative density function in units of a picture based on the gray level distribution;
   (b) calculating a mean level of the image signal in units of a picture;
   (c) obtaining a cumulative density function value corresponding to the mean level based on the cumulative density function; and
   (d) obtaining a compensated mean level by adding a brightness compensation value to the mean level according to the mean level of the input image; and
   (e) equalizing the image signal by mapping each input sample of the image signal to a gray level according to cumulative density function values corresponding to the input sample and the mean level, wherein the mean level is mapped into the compensated mean level.

8. A method for image enhancing as claimed in claim 7, further comprising a step of:
   (f) delaying the image signal in units of a picture;
   wherein, a delayed image signal is equalized in said step (e).

9. An image enhancing circuit for histogram-equalizing an image signal represented by a predetermined number of gray levels, said circuit comprising:
   first calculating means for calculating a mean level of an input image signal in units of a picture;
   second calculating means for calculating a gray level distribution of the image signal in units of a picture, calculating a cumulative density function in units of a picture based on the gray level distribution, and outputting a cumulative density function value corresponding to each input sample of the image signal and a cumulative density function value of the mean level; and
   outputting means for mapping the input sample to a gray level according to cumulative density function values corresponding to the input sample and the mean level and outputting a mapped level as an equalized signal, wherein the mean level is mapped unchanged.

10. An image enhancing circuit as claimed in claim 9, further comprising a picture memory for delaying the image signal in units of a picture to provide said outputting means with an image sample which belongs to a same frame as that from which the cumulative density function is calculated.

11. An image enhancing circuit as claimed in claimed 9, further comprising a buffer for storing the cumulative density function calculated by said second calculating means, updating in units of a picture, and outputting a cumulative density function value corresponding to the input sample and the mean level.

12. An image enhancing circuit as claimed in claimed 9, wherein said outputting means comprises:
   a first mapper for mapping the input sample to a gray level of a first range according to a first transform function which is defined by employing the cumulative density function and outputting a corresponding first signal;
   a second mapper for mapping the input sample to a gray level of a first range according to a second transform function which is defined by employing the cumulative density function and outputting a corresponding second signal;
   a comparator for comparing the input sample with the mean level to generate a selection control signal; and
   a selector for selecting one of the first signal output from said first mapper and said second signal output from said second mapper according to the selection control signal, wherein said selector selects the first signal output from said first mapper when the selection control signal indicates that the input sample is equal to or less than the mean level, and selects the second signal output from said second mapper when the selection control signal indicates that the input sample is larger than the mean level.

13. An image enhancing circuit as claimed in claimed 10, wherein said outputting means comprises:

a first mapper for mapping the image sample output by said picture memory to a gray level of a first range according to a first transform function which is defined by employing the cumulative density function and outputting a corresponding first signal;

a second mapper for mapping the image sample output by said picture memory to a gray level of a first range according to a second transform function which is defined by employing the cumulative density function and outputting a corresponding second signal;

a comparator for comparing the image sample output by said picture memory with the mean level to generate a selection control signal; and a selector for selecting one of said first signal output from said first mapper and said second signal output from said second mapper according to the selection control signal, wherein said selector selects the first signal output from said first mapper when the selection control signal indicates that the image sample output by said picture memory is equal to or less than the mean level, and selects the second signal output from said second mapper when the selection control signal indicates that the image sample output by said picture memory is larger than the mean level.

14. An image enhancing circuit for histogram-equalizing an image signal represented by a predetermined number of gray levels, said circuit comprising:

first calculating means for calculating a mean level of an input image signal in units of a picture;

second calculating means for calculating a gray level distribution of the image signal in units of a picture, calculating a cumulative density function in units of a picture based on the gray level distribution, and outputting a cumulative density function value corresponding to each input sample of the image signal and a cumulative density function value of the mean level;

brightness compensating means for adding to the mean level a brightness compensation value calculated by a predetermined compensation function according to the mean level of the input image signal to output a compensated mean level; and outputting means for mapping the input sample to a gray level according to cumulative density function values corresponding to the input sample and the mean level and outputting a mapped level as an equalized signal, wherein the mean level is mapped into the compensated mean level.

15. An image enhancing circuit as claimed in claim 14, further comprising a picture memory for delaying the image signal in units of a picture to provide said outputting means with an image sample which belongs to a same frame as that from which the cumulative density function is calculated.

16. An image enhancing circuit as claimed in claimed 14, further comprising a buffer for storing the cumulative density function calculated by said second calculating means, updating in units of a picture, and outputting a cumulative density function value corresponding to the input sample and the mean level.

17. An image enhancing circuit as claimed in claimed 14, wherein said outputting means comprises:

a first mapper for mapping the input sample to a gray level of a first range according to a first transform function which is defined by employing the cumulative density function and outputting a corresponding first signal;

a second mapper for mapping the input sample to a gray level of a first range according to a second transform function which is defined by employing the cumulative density function and outputting a corresponding second signal;

a comparator for comparing the input sample with the mean level to generate a selection control signal; and a selector for selecting one of the first signal output from said first mapper and said second signal output from said second mapper according to the selection control signal, wherein said selector selects the first signal output from said first mapper when the selection control signal indicates that the input sample is equal to or less than the mean level, and selects the second signal output from said second mapper when the selection control signal indicates that the input sample is larger than the mean level.

18. An image enhancing circuit as claimed in claimed 15, wherein said outputting means comprises:

a first mapper for mapping the image sample output by said picture memory to a gray level of a first range according to a first transform function which is defined by employing the cumulative density function and outputting a corresponding first signal;

a second mapper for mapping the image sample output by said picture memory to a gray level of a first range according to a second transform function which is defined by employing the cumulative density function and outputting a corresponding second signal;

a comparator for comparing the image sample output by said picture memory with the mean level to generate a selection control signal; and a selector for selecting one of said first signal output from said first mapper and said second signal output from said second mapper according to the selection control signal, wherein said selector selects the first signal from said first mapper when the selection control signal indicates that the image sample output by said picture memory is equal to or less than the mean level, and selects the second signal from said second mapper when the selection control signal indicates that the image sample output by said picture memory is larger than the mean level.

* * * * *